UNITED STATES PATENT OFFICE.

PERCY C. GILCHRIST, OF WESTMINSTER, COUNTY OF MIDDLESEX, ENGLAND.

MANUFACTURE OF STEEL AND INGOT-IRON.

SPECIFICATION forming part of Letters Patent No. 377,609, dated February 7, 1888.

Application filed August 23, 1887. Serial No. 247,682. (No specimens.)

*To all whom it may concern:*

Be it known that I, PERCY CARLYLE GILCHRIST, a subject of Her Majesty the Queen of Great Britain, residing at 9 Bridge Street, Westminster, in the county of Middlesex, England, have invented a certain new and useful Improvement in the Manufacture of Steel and Ingot-Iron by the Basic Process; and I do hereby declare that the following is a full, clear, and exact description of the invention, which will enable others skilled in the art to which it appertains to make and use the same.

Heretofore it has been customary when working the basic process in an open-hearth furnace to charge with the pig-iron employed a certain amount of solid scrap iron or steel in a cold or partially-heated state, and with these are charged the necessary amount of lime or limestone. A great disadvantage of this method of procedure consists in the fact that the scrap takes longer to melt than the pig-iron, while when both of these are in a molten state the lime or limestone may still remain in an unfluxed condition, and consequently not capable of acting to the best advantage.

The object of my present invention is to obviate these and certain other objectionable features in the process.

According to my present invention I propose to charge a basic-lined open-hearth furnace with pig-iron and lime or limestone in the ordinary way, but without the addition of scrap, and with a smaller percentage of lime than is usually employed or than would be necessary to wholly purify the charge of pig. While this charge is being melted I blow in a basic Bessemer converter sufficient pig-iron to form the rest of the charge for the open-hearth furnace, this pig-iron being preferably phosphoric. A considerable excess of lime is added in the converter. Thus if the charge be made up of seventy-five per cent. of pig-iron melted on the bed of the open-hearth furnace and twenty-five per cent. of metal added molten from the basic converter, the pig-iron employed containing about .5 to one per cent. of silicon and about two and one-half per cent. of phosphorus, then to the weight of the pig melted in the open hearth five to ten per cent. of its weight of lime in the form of limestone may be added, and to the pig-iron blown in the basic converter about twenty per cent. of its weight of lime may be added. When the charge in the open-hearth furnace is melted, or while it is yet in a semi-molten condition, I run into the open-hearth furnace the blown charge from the Bessemer converter, including the slag, which, though in a thoroughly heated or fluxed condition, still contains a quantity of free or uncombined lime, which serves for the purification of the charge in the open-hearth furnace. In this manner the scrap or pure iron, instead of being added cold to the pig charged in the open hearth, is practically made from pig in the converter, and is added in a molten state to the charge in the open hearth, the requisite lime being also introduced in a fluxed condition, and the time required to purify the charge is considerably shortened thereby. The amount of ore required to purify the charge in the open hearth will also be considerably lessened, as the oxides in the basic slag introduced with the blown metal serve equally as well as ore to purify the melted pig, thus both lessening the waste and the time required.

I am aware that it is not new to treat pig-iron in an acid or silicious lined Bessemer converter and subsequently transfer the charge to a basic-lined open-hearth furnace. It has also been proposed to first treat the metal in a basic-lined Bessemer converter and then transfer it to an acid-lined open hearth, and various other combinations of furnaces have been proposed, and I do not claim such combinations as forming the subject of my present invention; but What I do claim, and desire to secure by Letters Patent, is—

The improvement in the manufacture of steel and ingot-iron by the basic process, which consists in charging a basic-lined open-hearth furnace with a portion of the metal to be converted and with a portion of the basic material necessary for its purification, and, when said charge is in a molten or semi-molten state, running in thereon from a basic Bessemer converter a molten charge, together with the basic slag which has been formed, which slag contains excess of lime and iron oxides, substantially as and for the purposes set forth.

In testimony whereof I have hereunto set my hand in the presence of two subscribing witnesses.

PERCY C. GILCHRIST.

Witnesses:
W. J. NORWOOD,
ARTHUR R. SKERTEN,
Both of No. 17 Gracechurch Street, London.